Patented July 12, 1949

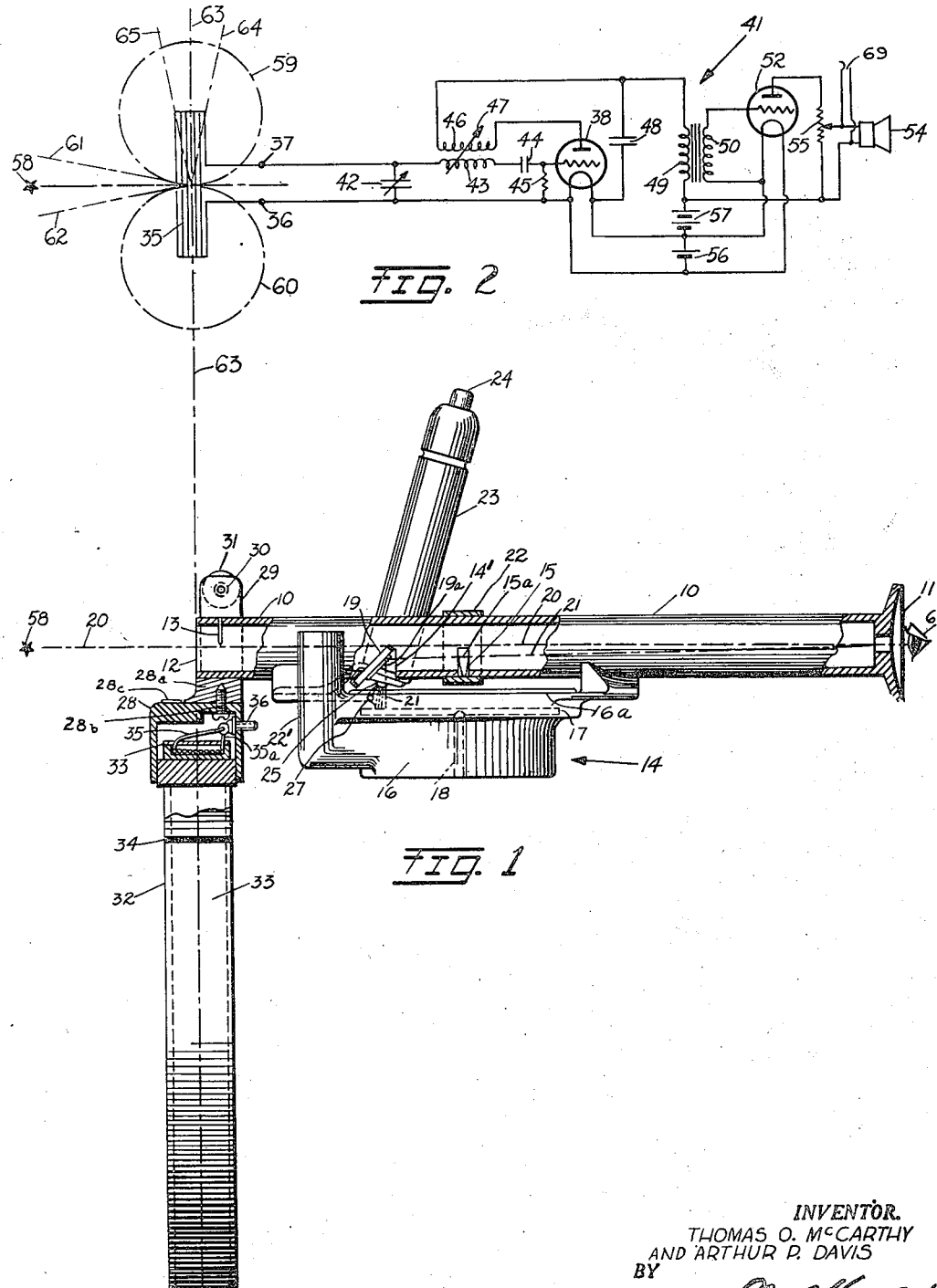

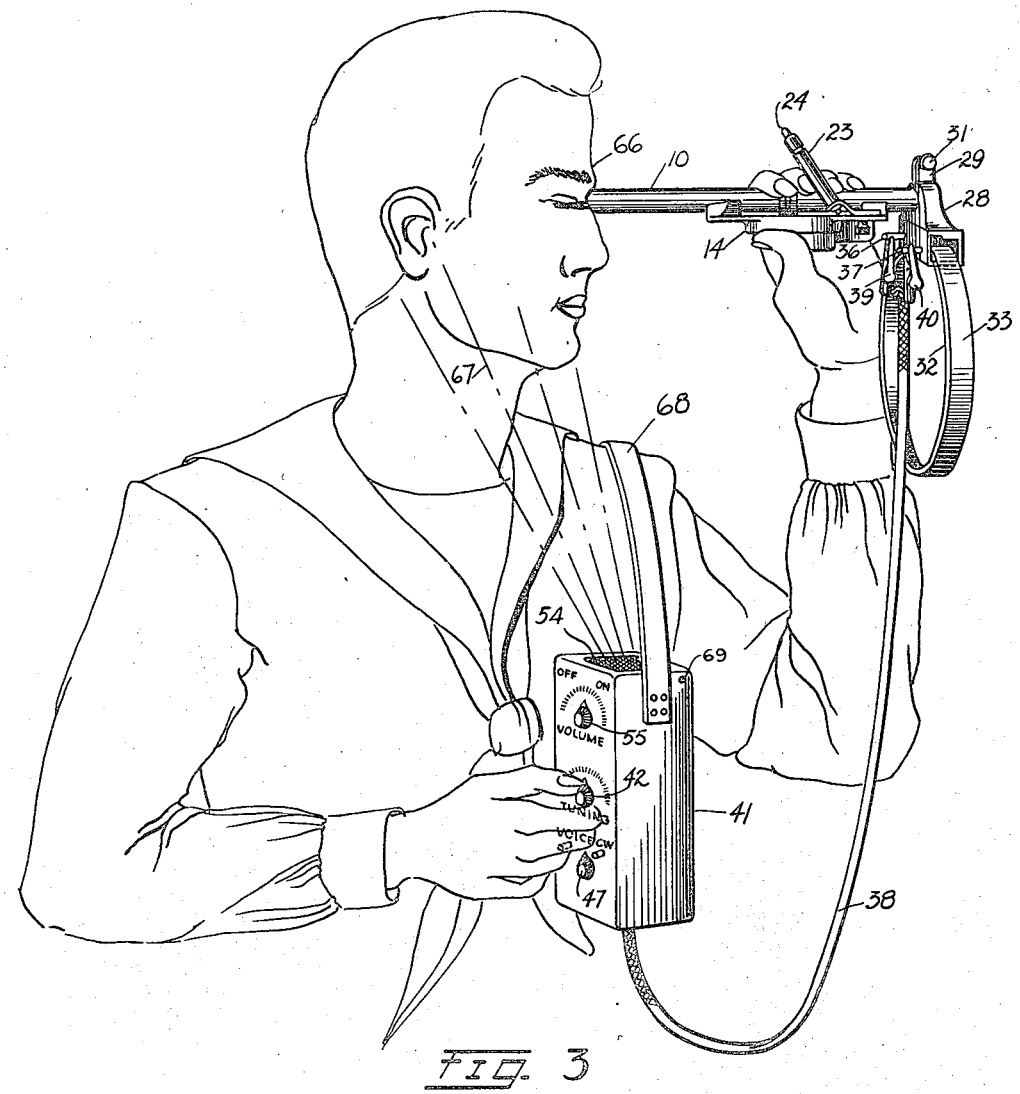

2,475,975

UNITED STATES PATENT OFFICE 2,475,975

APPARATUS FOR DIRECTION FINDING

Thomas O. McCarthy, United States Navy, and
Arthur P. Davis, New York, N. Y.

Application April 15, 1946, Serial No. 662,130

2 Claims. (Cl. 343—113)

This invention refers to an apparatus for determining direction, and more particularly to a combination magnetic, visual, and radio direction finder.

An object of this invention is to provide a single, compact and portable device by means of which visual and radio bearings can be individually or simultaneously determined and simultaneously referred to and correlated with a magnetic-compass bearing.

Another object is to provide a compact and portable device by means of which the direction of a radio radiating structure may be determined with respect to magnetic north.

Another object is to provide means whereby the magnetic compass can be maintained in a substantially level position while in use and thus permit free operation of its moveable element.

Another object is to provide a portable device of the type herein described which can be readily carried to and used at any suitable location where visual, magnetic, and electrical interferences are at a minimum.

Another object is to provide a device as described herein which may be readily carried and supported by the observer, while in use, in such position and accessibility as will enable convenient and ready use and operation of its bearing determining elements and control members, and at the same time insure effective response by sight and sound.

Another object is to provide a combination of different facilities whereby visual, radio, and magnetic bearings can be correlated during periods of daylight or darkness.

Another object is to provide in a single instrument a plurality of direction-determining facilities of such a nature that at least two of them will be operative during periods of inclement weather.

Another object is to provide a portable unitary apparatus capable of being carried, and used while being carried, by the observer.

Further objects and advantages of this invention, as well as its construction, arrangement and operation will be apparent from the following description and claims in connection with the accompanying drawing, in which:

Fig. 1 is an elevation view, partly in section showing the various direction determining elements of the device.

Fig. 2 is a schematic wiring diagram of a circuit that may be used with the device, together with a characteristic response graph of the receptor element.

Fig. 3 shows the device as carried by the observer while in use.

As shown in Fig. 1, a telescopic sight consisting of enclosing tube 10, of any suitable non-magnetic material but preferably of metal, is provided with an apertured eyepiece 11, an open end 12, and a centering pin 13. Secured to tube 10, by any suitable means, is a magnetic compass, generally indicated as 14, and consisting of any suitable material of any suitable design but preferably of the simple liquid-damping type having a liquid chamber formed by the compass casing or housing 16 wherein the compass card 17 may be supported on a pivot pin 18 and its abrupt motion retarded by the damping liquid, and the liquid chamber formed by casing 16 closed and sealed against leakage by means of a cover glass 16a.

Angularly positioned intermediate the ends and within tube 10 at a slot or opening 14' is secured a supporting frame or plate 19 to which there is secured a small mirror 19a which obstructs a portion of the inner diameter of the tube 10. The angular position of mirror 19a, and its purpose, is such as to direct a portion of the line of vision from eyepiece 11 down to the compass card 17 while at the same time permitting a sufficiently unobstructed view of the object on which visual observations are to be made by means of open end 12 and object centering pin 13.

Located within tube 10 at a second slot 15, and a suitable distance ahead of mirror 19a, is a lens 15a obstructing not over one-half the diameter of tube 10. This lens is focused to provide accommodation for the observer's eye 66 when sighting is divided between the distant object 58 along sight-line 20 and the magnetic-compass reading along sight-line 21 by means of mirror 19a. A suitable sliding cap 22, embracing tube 10, serves to secure lens 15a in place, permit of ready removal or replacement, and exclude from the interior of the tube undesired external light.

An air chamber 22' communicating with the liquid chamber of casing 16 is provided for the purpose of eliminating air bubbles from the liquid chamber as is well-known in the magnetic compass art.

Illumination of the compass card 17 during darkness is provided by means of a small electric flashlight suitably mounted on tube 10 and includes housing 23 containing a suitable dry cell, control pushbutton 24, and a suitable incandescent lamp behind lens 25.

In order that a pivotally supported compass card can freely rotate it is necessary that it be kept in a substantially level position while in use. To enable the observer to maintain the instrument in substantially level position a bubble-type spirit level 27 is secured to the compass housing or casing frame 16 at the position indicated with its longitudinal axis located in a horizontal plane at right angles to the longitudinal axis of telescope tube 10 near the indicator of the magnetic-compass card 17, and within range of the light rays from flashlight lens 25, where it can be simultaneously observed together with the magnetic bearing indicated on the compass card.

The apparatus thus far described provides a portable unitary instrument for the accurate and simultaneous observation of visual and magnetic bearings which may be carried by the observer to any suitable location outside of the influence of magnetic structures and visual barriers.

The term "portable" as used throughout this description refers to equipment capable of use while being carried on the person of the observer.

Suitably attached to, and preferably at the open end of, telescope tube 10 is a radio direction finding receptor-coil swivel supporting bracket 28a having a split head 29, tightening or securing screw 30 cooperating with thumb-nut 31, and a lower portion 28 secured for relative rotary movement by means of screw 28b. A scale 28c enables the degree of relative displacement from the longitudinal axis of telescope tube 10 to be observed. This arrangement enables any differences between visual and radio bearings to be noted. Suitably supported in bracket 28 is the receptor-coil supporting frame 32 and cap 33 of any suitable shape, in this case indicated as circular, preferably constructed of non-magnetic metal and having its electrical continuity interrupted by means of a slot 34 located at any suitable position and filled with suitable insulating material to exclude moisture and render desired mechanical support. The purpose of insulated slot 34 is to permit the receptor coil supporting frame 32 and cap 33 to act as a shield and decrease the external capacity effects of receptor coil or winding 35 without preventing the receptor coil from picking up the desired electromagnetic component of the arriving energy.

The ends of receptor-coil winding 35 and 35a are connected to suitable terminals 36 and 37 one of which may be grounded to the supporting frame bracket 28.

A suitable co-axial, or other-type cable 38 (Fig. 3) provided with suitable terminals 39 and 40 to facilitate quick and easy connection and disconnection, may be used to connect the receptor coil 35 with the radio receiver 41. Also, the outer conductor or shield of co-axial cable 38 can, for best results, be grounded to the coil supporting frame bracket 28 and to the casing of radio receiver 41 to insure good electrical conductivity between the bracket 28, coil frame 32, closing cap 33, telescope tube 10, and the case of radio receiver 41, so that the operator's body, when holding the instrument in operating position, will also become a part of the general grounding system and thus reduce electrical distortions to a minimum.

The center of gravity of the receptor coil and shielding structure is preferably located below the longitudinal axis of telescope tube 10 so as to aid in maintaining the telescope tube and magnetic compass in suitable level position when in use.

Fig. 2 is a schematic wiring diagram of apparatus which may be used. It consists of receptor-loop winding 35 connected to terminals 36 and 37 feeding vacuum tube detector 38. Shunted across the line-feeding vacuum tube 38 is a variable tuning condenser 42, and in series in the grid lead is the primary winding 43 of a variable coupling transformer, and a grid condenser 44. A grid leak 45 of suitable resistance value is connected between the grid and cathode of vacuum-tube detector 38. The secondary winding 46 of the variable coupling transformer is connected in series with the plate of vacuum-tube detector 38 and by means of coupling control 47 permits the circuit to function for the reception of modulated currents (voice or music) with regenerative amplification, or if the coupling is still further increased vacuum-tube detector 38 will go into a self-oscillation state by means of which continuous waves can be received and detected in the well-known heterodyne manner. A by-pass condenser 48 may be used, if desired, to shunt the primary 49 of the audio amplifying transformer 41 and the plate-current source 57.

Audio-amplifying-transformer secondary 50 is connected to the cathode and grid members of amplifying vacuum tube 52 and its output is arranged to feed a suitable loud-speaker or other translating device 54 through a volume-control potentiometer or variable resistor 55. Energy for the anodes and cathodes of vacuum tubes 38 and 52 may be furnished from common sources of "A" battery 56 and "B" battery 57. Any desirable number of stages of amplification or any suitable combination of vacuum tubes or wiring system can be used as required or desirable. A jack 69 is connected in parallel with loud-speaker 54 so that headphones may be inserted in the receiving system when signals too weak properly to actuate the loud speaker are received.

In making accurate determinations of the direction in which radio signals are arriving, the minimum-energy-response position of receptor loop 35 can be used as indicated in the position shown where 58 is the radiating structure and, because of the figure of eight characteristic 59 and 60 of a coil receptor loop, the received energy will vary with rotation of the loop between the positions indicated by lines 61 and 62 to much greater extent than if the radiating source were located along line 63 and the loop's rotation varied as indicated between lines 64 and 65, under which condition maximum energy response would prevail.

For unilateral direction determinations a plain antenna effect can also be added in a conventional manner to the system of Fig. 2 and thus the actual radio bearing can be distinguished from its reciprocal.

In Fig. 3 is shown the arrangement of the device while in use and carried by the observer 66. With the telescope portion 10 raised to eye level the distant object 58 (Figs. 1 and 2) is bisected by centering pin 13 (Fig. 1) while the magnetic bearing of compass 14 and the aural null response of the receptor coil 35 within casing 32 and 33 are observed. Adjustment to the desired frequency is effected by means of control 42 on the radio receiver 41 while modulated or continuous wave reception is attained and regeneration controlled by means of control 47. Volume can be altered by means of control 55. Audible signals 67 will be emitted by the loud-speaker 54 and directed upward toward the observer's ear.

In the event microwave frequencies are employed the loop or coil 35 can be replaced with a suitable reflector or focusing antenna, and a wave guide substituted for co-axial cable 38.

Joint reactions from distant objects on the various associated devices eliminate the time inaccuracies that may otherwise prevail if separate observations were made by the same or different observers from or upon a moving object such as, for example, a ship afloat, an airplane, or a moving celestial body.

The expression "single" or "simultaneous" observation as used herein is defined as observations made by one observer at the same instant on different response devices.

The term "magnetic compass" as used herein is defined as an indicating device actuated by terrestrial polar magnetism, or any substitute device of the gyro, or repeater, type.

It is a well-known fact that visual and radio bearings may vary due to refraction and that radio and magnetic bearings may vary because of interfering electric and magnetic fields; therefore when coincidence of all three is obtained, either directly or by means of correction factors, the accuracy of direction is well established. Some of these conditions may occur for instance when light and radio waves are directed or reflected to earth from celestial bodies such as, for example, the moon, where refraction is at a maximum when the path of observation lies near the earth's horizon although not necessarily to the same extent for both visual light and radio waves because refraction appears to depend to an extent upon the frequency or wave length of the radiation involved.

For facility of support in a suitable operating and carrying position a shoulder strap 68 is attached to the receiver 41.

Some of the various results that can be accomplished by the device as shown and described include the following:

(a) Aboard ship the apparatus can be carried to and used on the person of the observer away from the detrimental influences of stays, masts, and other obstructions and radiating structures.

(b) At sea, in dense forests or elsewhere, the magnetic bearing of radio-radiating structures can be accurately determined by means of simultaneous observations of the direction of arriving radio waves as referred to the earth's magnetic field, regardless of conditions of visibility.

(c) The accuracy of the bearing of radiations from radio radiating structures with respect to the visual bearing can be determined.

(d) The deviation of magnetic north with respect to visual and radio bearings of radiating structures can be readily determined.

(e) The observers position with respect to two radio-radiating structures, or one radio-radiating structure and one visible structure, and magnetic north can be determined by observation and triangulation.

(f) Small boats such as carried by naval vessels can operate at night and in conditions of low visibility using radio signals of a distinctive character radiated by the mother ship or by radiating stations on the beach or on other ships; either by determining the correct compass course and steering that course by this device or by using the radio signal in the manner of a homing device.

(g) Guard boats going from ship to ship at a fleet anchorage, can, in low visibility identify and steer for any ship radiating a distinctive signal either by determining the correct compass course to steer by the compass on this device, or by utilizing the radio receptive feature as a homing device.

(h) Men operating ashore, under cover of darkness or low visibility, can keep orientated and know the direction of a radiating station such as could be carried in a small boat or on landing craft and can, by this means, guide themselves to such a station.

Various modifications and changes can be made in the above-described apparatus without departing from the spirit and scope of this invention as set forth in the appended claims.

What is claimed is:

1. A portable direction finding instrument comprising, in combination, an optical telescope including a tubular body part having an eyepiece end and an objective end, a magnetic compass depending from and supported by said tubular body part at a portion thereof intermediate the ends of said tubular part, a radio receptor loop rotatably supported by said telescope substantially at the objective end thereof, a radio receiver adapted to be detachably connected to said loop, and a shoulder strap supporting said receiver on the person of the user.

2. The instrument defined in claim 1 wherein said receptor loop is secured for rotative motion relative to said telescope with the center of gravity of said loop normally below said telescope.

THOMAS O. McCARTHY.
ARTHUR P. DAVIS.

REFERENCES CITED

The following references are of record in the file of this patent:

UNITED STATES PATENTS

| Number | Name | Date |
| --- | --- | --- |
| 1,151,336 | Beyer | Aug. 24, 1915 |
| 1,182,473 | Green et al. | May 9, 1916 |
| 1,811,547 | Jakosky | June 23, 1931 |
| 1,999,232 | Eicke | Apr. 30, 1935 |
| 2,046,473 | Leib | July 2, 1936 |
| 2,066,561 | Fisher | Jan. 5, 1937 |
| 2,169,553 | Bruce | Aug. 15, 1939 |
| 2,418,465 | Doba | Apr. 8, 1947 |